(12) United States Patent
Tomita

(10) Patent No.: US 11,283,939 B2
(45) Date of Patent: Mar. 22, 2022

(54) INFORMATION PROCESSING DEVICE, NON-TRANSITORY COMPUTER-READABLE RECORDING MEDIUM STORING CONTROL PROGRAM, AND CONTROL METHOD

(71) Applicant: SHARP KABUSHIKI KAISHA, Osaka (JP)

(72) Inventor: Chikako Tomita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/097,562

(22) Filed: Nov. 13, 2020

(65) Prior Publication Data

US 2021/0195039 A1 Jun. 24, 2021

(30) Foreign Application Priority Data

Dec. 23, 2019 (JP) .............................. JP2019-231108

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00214* (2013.01); *G06F 3/1204* (2013.01); *G06F 3/1232* (2013.01); *G06F 3/1236* (2013.01); *G06F 3/1292* (2013.01)

(58) Field of Classification Search
CPC . H04N 1/00214; G06F 3/1204; G06F 3/1232; G06F 3/1236; G06F 3/1292
USPC .............................. 358/1.15, 1.14, 1.13, 1.1
See application file for complete search history.

(56) References Cited

U.S. PATENT DOCUMENTS 10,812,668 B2* 10/2020 Sugita ................ H04N 1/32122
2019/0303075 A1* 10/2019 Yamada ................ G06F 3/1285
2021/0144264 A1* 5/2021 Toda ....................... H04L 51/24

FOREIGN PATENT DOCUMENTS

JP 2006-155259 A 6/2006

* cited by examiner

*Primary Examiner* — Douglas Q Tran
(74) *Attorney, Agent, or Firm* — ScienBiziP, P.C.

(57) ABSTRACT

An information processing device includes a CPU, and when the information processing device receives print image data through a network, the CPU sets a transmission destination of the print image based on transmission history of a user.

5 Claims, 12 Drawing Sheets

FIG. 6

IDENTIFICATION TABLE 300

| USER ID | LOGIN ID | COMMON ID |
|---------|----------|-----------|
| XXX | 333 | XC3 |
| YYY | 666 | TC7 |
| ZZZ | 999 | VT9 |
| ⋮ | ⋮ | ⋮ |

FIG. 7

OLD DATA TABLE 320

| DATA NAME | DATE AND TIME OF LAST UPDATE | DATA FORMAT | KEYWORD | DEVICE ID | TRANSMISSION DATE AND TIME | ... |
|-----------|------------------------------|-------------|---------|-----------|----------------------------|-----|
| AAA | 2017/03/05 /15:18:12 | A | AA | A3CC | 2017/03/05 /15:20:12 | ... |
| BBB | 2018/03/03 /09:18:15 | B | BB | E2BB | 2017/03/05 /15:18:12 | ... |
| 111 | 2019/05/22 /20:20:59 | C | 11 | E2BB | 2017/03/05 /15:18:12 | ... |
| ⋮ | ⋮ | ⋮ | ⋮ | ⋮ | ⋮ | ... |

FIG. 8

FIRST TRANSMISSION NUMBER TABLE 340

| DEVICE ID | TOTAL NUMBER OF TRANSMISSIONS | A | B | C | ... |
|---|---|---|---|---|---|
| A3CC | 84 | 64 | 12 | 8 | ... |
| E2BB | 63 | 45 | 8 | 10 | ... |
| ⋮ | ⋮ | ⋮ | ⋮ | ⋮ | ... |

FIG. 9

SECOND TRANSMISSION NUMBER TABLE 360

| DEVICE ID | TOTAL NUMBER OF TRANSMISSIONS | AA | BB | 11 | ... |
|---|---|---|---|---|---|
| A3CC | 84 | 24 | 20 | 40 | ... |
| E2BB | 63 | 10 | 33 | 20 | ... |
| ⋮ | ⋮ | ⋮ | ⋮ | ⋮ | ... |

FIG. 10

STATUS TABLE 380

| DEVICE ID | NUMBER OF USES | DATE AND TIME OF USE |
|---|---|---|
| A3CC | 265 | 2017/03/07 /20:18:14 |
| E2BB | 98 | 2017/03/09 /22:20:12 |
| ⋮ | ⋮ | ⋮ |

INFORMATION PROCESSING DEVICE, NON-TRANSITORY COMPUTER-READABLE RECORDING MEDIUM STORING CONTROL PROGRAM, AND CONTROL METHOD

BACKGROUND OF THE INVENTION

Field of the Invention

The present invention relates to an information processing device, a non-transitory computer-readable recording medium storing a control program, and a control method, and more particularly, to an information processing device, a non-transitory computer-readable recording medium storing a control program, and a control method for transmitting received print image data to another device, for example.

Description of the Background Art

An example of this type of background is disclosed in Japanese Unexamined Patent Publication No. 2006-155259. In the technology disclosed in the patent document, print data is registered in a print data server from a terminal, and a user selects a network printer for printing the print data from a portable terminal. When the network printer is selected, and print is reserved, the print data is transmitted from the print data server to the selected network printer.

However, in the network print system of the background technology, the user needs to select the network printer for printing the print data in advance, and it is troublesome.

Therefore, a main object of the present invention is to provide a novel information processing device, a non-transitory computer-readable recording medium storing a control program, and a control method.

Also, another object of the present invention is to provide an information processing device, a non-transitory computer-readable recording medium storing a control program, and a control method that can save a time and effort for selecting a transmission destination of print image data.

SUMMARY OF THE INVENTION

A first invention is an information processing device, which includes a communicator that communicates with a plurality of devices, a storage that stores a number of transmissions of print image data for each user, a receiver that receives print image data through the communicator, a transmission destination setter that sets an image forming device for output that is highly likely to be used by a user from a plurality of image forming devices based on the number of transmissions when the receiver receives print image data, and a transmitter that transmits the print image data to the image forming device for output through the communicator when the image forming device for output is set by the transmission destination setter.

A second invention depends on the first invention, and the transmission destination setter sets the image forming device for output in accordance with a number of transmissions of print image data having a characteristic that is common to or related to the print image data.

A third invention depends on the second invention, and the transmission destination setter sets the image forming device for output based on a number of transmissions of a keyword or a data format that is the characteristic of the print image data.

A fourth invention depends on any one of the first to third inventions, and the information processing device further includes a communication determiner that determines whether to be capable of communicating with the image forming device for output before transmitting the print image data when the image forming device for output is set, and the transmission destination setter sets another image forming device as the image forming device for output based on the number of transmissions before transmitting the print image data when the image forming device for output is unable to communicate.

A fifth invention is a non-transitory computer-readable recording medium that stores a control program executed by an information processing device including a communicator that communicates with a plurality of devices, and a storage that stores a number of transmissions of print image data for each user, and the control program causes the information processing device to receive print image data through the communicator, set for a transmission destination an image forming device for output that is highly likely to be used by a user from a plurality of image forming devices based on the number of transmissions when receiving the print image data, and transmit the print image data to the image forming device for output through the communicator when the image forming device for output is set, in the set for the transmission destination.

A sixth invention is a method of controlling an information processing device including a communicator that communicates with a plurality of devices, and a storage that stores a number of transmissions of print image data for each user, and the method includes (a) receiving print image data through the communicator, (b) setting for a transmission destination an image forming device for output that is highly likely to be used by a user from a plurality of image forming devices based on the number of transmissions when receiving the print image data in the (a), and the (c) transmitting the print image data to the image forming device for output through the communicator when the image forming device for output is set in the (b).

According to the present invention, it is possible to save the time and effort for selecting the transmission destination of print image data.

The above-described objects, other objects, features and advantages of the present invention will become more apparent from the following detailed description of embodiments with reference to the drawings.

BRIEF DESCRIPTION OF THE DRAWINGS

FIG. 6 is a diagram illustrating an example of an identification table.

FIG. 7 is a diagram illustrating an example of an old data table.

FIG. 8 is a diagram illustrating an example of a first transmission number table.

FIG. 9 is a diagram illustrating an example of a second transmission number table.

FIG. 10 is a diagram illustrating an example of a status table.

DESCRIPTION OF THE PREFERRED EMBODIMENTS

First Embodiment

Figure 1:
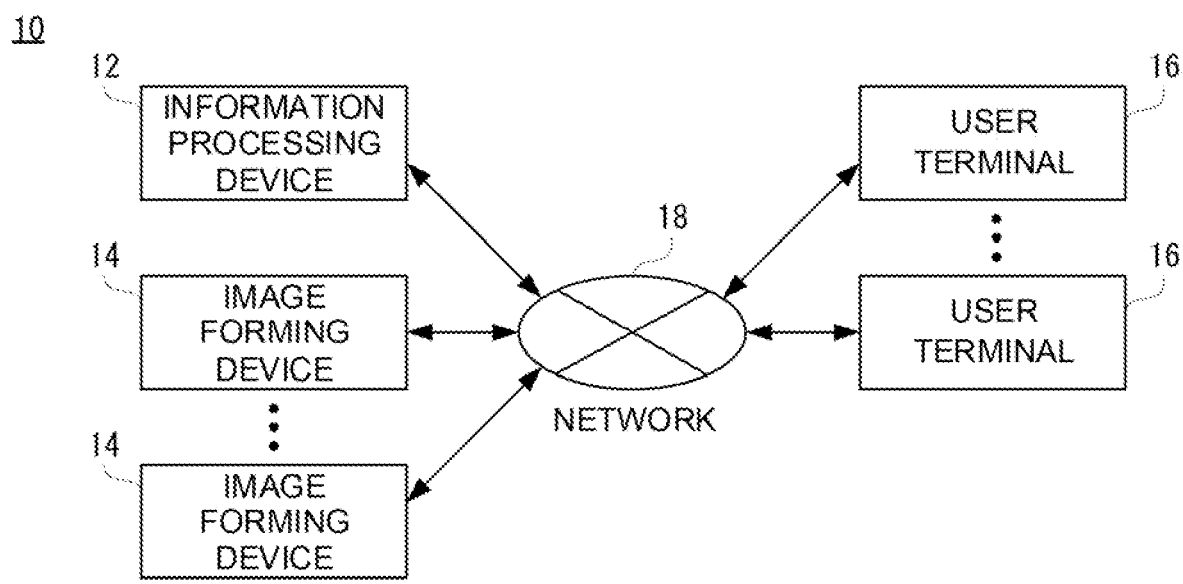
FIG. 1 is a diagram illustrating an example of a configuration of a printing system of the present invention.

FIG. 1 is a diagram illustrating an example of the configuration of a printing system 10 according to a first embodiment. As illustrated in FIG. 1, the printing system 10 includes an information processing device 12, a plurality of image forming devices 14, and a plurality of user terminals 16.

The information processing device 12 is a general-purpose server. Note that an image forming device such as a multifunction peripheral (MFP) may be used as long as the information processing device 12 functions as a server.

The image forming device 14 is a multifunction peripheral having a photocopy function (copy function), a printer function, a scanner function, a facsimile function, and the like. However, the image forming device 14 is also applicable to other image forming devices such as a printing device (printer).

The user terminal 16 is a mobile phone (including a smartphone), a communication terminal such as a personal digital assistant (PDA), a desktop personal computer (PC), a notebook (laptop) PC, a tablet PC, or the like.

Further, the user terminal 16 includes at least a central processing unit (CPU), a communicator for communicating with the outside, and a storage such as electrically erasable programmable read-only memory (EEPROM) which is a non-volatile memory.

The communicator includes a communication module such as a network interface card (NIC) or a communication circuit for connecting to a network 18 by wire or wirelessly, and communicates via the network 18 according to an instruction from the CPU. As an example, the communicator transmits and receives data according to a wired communication method compliant with a communication standard such as Ethernet (registered trademark), a wireless communication method compliant with a communication standard such as IEEE 802.11, or the like. This also applies to a communicator 38 (see FIG. 2) and a communicator 72 (see FIG. 3), which will be described later.

Further, the communicator in the user terminal 16 stores data for identifying a user (user identification data). More specifically, the data is stored in a memory in the NIC. An example of the user identification data is, for example, data indicating a media access control (MAC) address, data indicating a serial number, or the like. Note that the user identification data may be stored in a storage in the user terminal 16.

Each of the information processing device 12, the plurality of image forming devices 14, and the plurality of user terminals 16 is connected to one another via the network 18 constituted by the Internet. Note that the network 18 may be constituted by a telephone network (public telephone network or mobile phone communication network) and the Internet.

Further, the information processing device 12 and each of the image forming devices 14 may be directly connected to one another. This applies to the information processing device 12 and each of the user terminals 16 as well.

Figure 2:
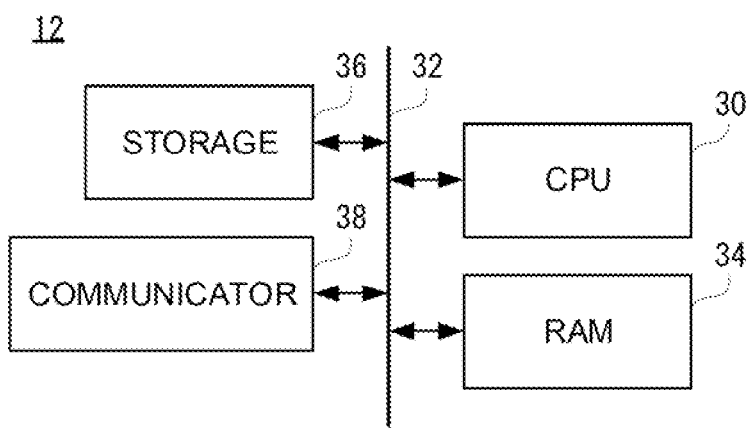
FIG. 2 is a block diagram illustrating an electrical configuration of an information processing device.

FIG. 2 is a block diagram illustrating an electrical configuration of the information processing device 12 in FIG. 1. As illustrated in FIG. 2, the information processing device 12 includes a CPU 30, and is connected to a random access memory (RAM) 34, a storage 36, and the communicator 38 via a bus 32.

The CPU 30 controls the entire information processing device 12. The RAM 34 is used as a work area and a buffer area for the CPU 30.

The storage 36 is a main storage device of the information processing device 12, and is constituted by a non-volatile memory such as a hard disk drive (HDD) or an EEPROM. Further, the storage 36 may be configured to include the RAM 34. The storage 36 stores data for a control program for causing the CPU 30 to execute each determination, data received via the communicator 38, data necessary for executing the control program, and the like.

Figure 3:
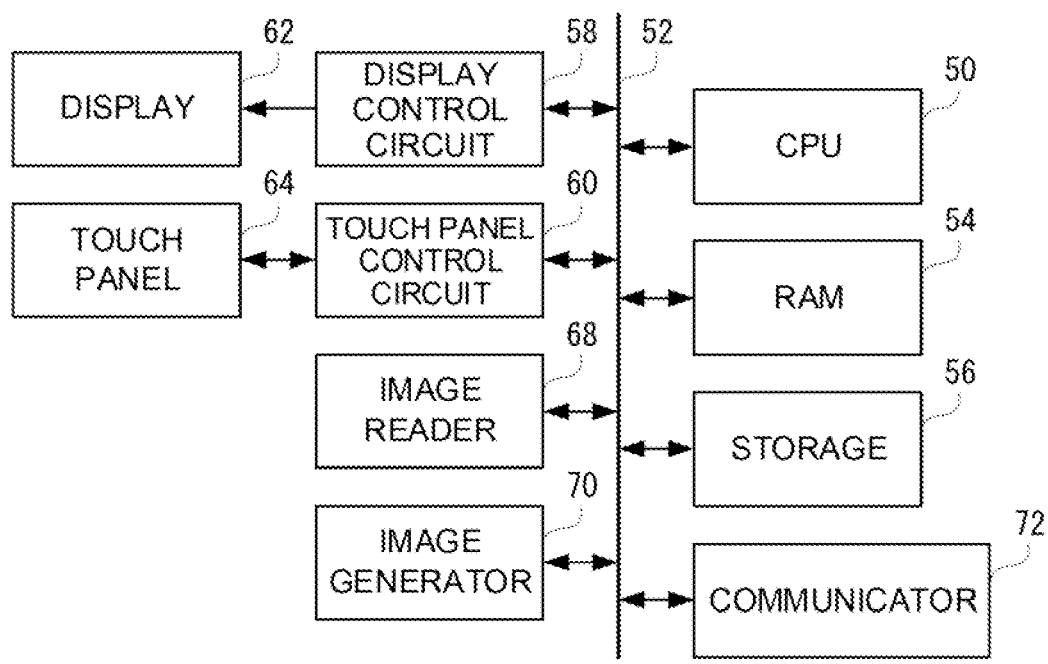
FIG. 3 is a block diagram illustrating an electrical configuration of an image forming device.

FIG. 3 is a block diagram illustrating an electrical configuration of the image forming device 14 in FIG. 1. As illustrated in FIG. 3, the image forming device 14 includes a CPU 50, and is connected to a RAM 54, a storage 56, a display control circuit 58, a touch panel control circuit 60, an image reader 68, an image generator 70, and a communicator 72 via a bus 52.

Further, the image forming device 14 includes a display 62 and a touch panel 64. The display control circuit 58 is connected to the display 62, and the touch panel control circuit 60 is connected to the touch panel 64.

The CPU 50 controls the entire image forming device 14. The RAM 54 is used as a work area and a buffer area for the CPU 50.

The storage 56 is a main storage device of the image forming device 14, and constituted by an HDD and a non-volatile memory such as an EEPROM. Further, the storage 56 may be configured to include the RAM 54. The storage 56 stores data for a control program for causing the CPU 50 to control the operation of each part of the image forming device 14, data of images (display images) for various screens, data necessary for executing the control program, and the like.

The display control circuit 58 includes a graphics processing unit (GPU), a video RAM (VRAM), and the like, and, under an instruction of the CPU 50, the GPU generates, in the VRAM, a display image for displaying various screens on the display 62 using display image generation data stored in the RAM 54, and outputs the generated display image to the display 62. As the display 62, for example, a liquid crystal display (LCD), an electro-luminescence (EL) display, or the like can be used.

The touch panel control circuit 60 applies a necessary voltage or the like to the touch panel 64, detects a touch operation or a touch input within the touch effective range on the touch panel 64, and outputs touch coordinate data indicating the position of the touch input to the CPU 50.

The touch panel 64 is a general-purpose touch panel, and can be constituted by any type of touch panel, such as an electrostatic capacitance type, an electromagnetic induction type, a resistive film type, or an infrared type. In the first embodiment, an electrostatic capacitance type touch panel is used for the touch panel 64, which is provided on the display surface of the display 62. However, a touch panel display in which the display 62 and the touch panel 64 are integrally formed may be used.

The image reader 68 includes a light source, a plurality of mirrors, an imaging lens, a line sensor, and the like. The image reader 68 guides light reflected from the surface of a document to the imaging lens by the plurality of mirrors. Then, the reflected light is imaged on a light receiving element in the line sensor by the imaging lens. The line sensor detects the brightness or chromaticity of the reflected light imaged on the light receiving element. Image data is input by detecting the brightness or chromaticity of the reflected light imaged on the light receiving element and generating read image data based on the image on the surface of the document. Further, as the line sensor, a complementary metal oxide semiconductor (CMOS), a charge coupled device (CCD), or the like is used.

The image generator 70 includes a photosensitive drum, a charging device, an exposure device, a developing device, a transfer device, a fixing device, and the like, and forms an image on a recording medium by using a dry electrophotographic method. As image data to be formed on the recording medium, read image data, image data (print image data) sent from an external information processing device or the like are used. Further, the recording medium is not limited to a recording sheet made of paper, and a sheet other than the paper such as an overhead projector (OHP) film is also used.

Further, data (device identification data) for identifying the image forming device 14 is stored in a memory in the NIC of the communicator 72. Note that the device identification data may be stored in the storage 56, the RAM 54, or the like.

Further, the communicator 72 includes a communication circuit, an antenna, and the like for performing short-range wireless communication by the NFC method, the Bluetooth (registered trademark), or the like, and enables user authentication by an IC card, for example. Note that the short-range wireless communication transmits and receive data, based on a scheme conforming to a standard such as ISO/IEC18092 or ISO/IEC14443.

Note that the electrical configuration of the information processing device 12 in FIG. 2 and the image forming device 14 in FIG. 3 is merely an example, and is not limited to the example.

In response to reception of a predetermined operation (registration operation of print image data) in the user terminal 16, print image data and user identification data associated with the print image data are transmitted from the user terminal 16 to the information processing device 12.

When the information processing device 12 receives the print image data and the user identification data, the information processing device 12 identifies the user who has transmitted the print image data in accordance with the user identification data.

Further, when the information processing device 12 identifies the user, the information processing device 12 selects (sets) the image forming device 14 (the image forming device 14 for output) that is highly likely to be used by the user from the plurality of image forming devices 14, based on the transmission history of the user. When the image forming device 14 for output is selected, the information processing device 12 transmits the print image data to the image forming device 14 for output.

Hereinafter, a method of selecting the image forming device 14 for output will be described in detail. First, when there is old data of the received print image data, the image forming device in which the old data is stored (which has transmitted the old data) is set as the image forming device 14 for output from the plurality of image forming devices 14.

The old data is print image data which has the same data name and data format as the received print image data, whose last update date and time is older than the last update date and time of the received print image data, and which has not been printed. Note that, when there is the old data, the received print image data can be referred to as update data for the old data.

Further, even if the print image data, which has already stored in any of the image forming devices 14 and has the same data name and data format as the received print image data, the print image data whose last update date and time is newer than the last update date and time of the received print image data is not treated as the old data. In this case, since the print image data, which has already stored in the image forming device 14, is newer, it is not necessary to update the print image data. Further, it will be appreciated that the print image data already printed is not treated as the old data.

Then, when there is the old data, the information processing device 12 transmits the print image data (update data) to the set image forming device 14 for output, regardless of the other conditions.

When there is no old data of the received print image data, the image forming device 14 for output is selected, based on the number of transmissions of the print image data of the identified user.

For example, the image forming device 14 for output is selected in accordance with the number of transmissions of the print image data (the number of uses of the image forming device 14) for each user. In this case, the image forming device 14 for output may be selected in accordance with the number of transmissions of all kinds of print image data, regardless of any characteristic of the print image data.

Further, the image forming device 14 for output may be selected in accordance with the number of transmissions of the print image data having a characteristic common or related to the received print image data. More specifically, among the plurality of image forming devices 14, the image forming device having the largest number of transmissions of the print image data that has the common or related characteristic with the received print image data is set as the image forming device 14 for output.

The characteristic of the print image data is a data format of the print image data, a specific keyword included in the data name of the print image data, or the like.

For example, the image forming device 14 for output may be selected in accordance with the number of transmissions of the print image data with a data format that is common to or related to the data format of the received print image data. The common data format refers to the same data format, and the related data format refers to a compatible data format.

Further, the image forming device 14 for output may be selected according to the number of transmissions of the print image data in which a keyword common to a specific keyword included in the data name of the received print image data is included in the data name. However, among character strings included in the data name of the print image data, the character string indicating the version, the character string indicating the date, and the character string indicating the prefix are not treated as the keyword of the present invention.

Note that, among the characteristics included in the print image data, which characteristic to focus on for selecting the image forming device 14 may be set in advance or selected by a user.

In addition, when there are a plurality of image forming devices 14 each having the highest number of transmissions of the print image data having the common or related characteristic, the image forming device having the largest number of transmissions of all types of the print image data may be set as the image forming device 14 for output, or each of the uppermost image forming devices 14 may be set as the image forming device 14 for output, among the image forming devices 14.

Further, the image forming device 14 used last by the user (to which the print image data of the user is transmitted last) may be set as the image forming device 14 for output. When the user has never used the printing system 10, that is, the printing image data of the user has never been transmitted to any one of the image forming devices 14, the method is not adopted.

When the image forming device 14 for output is set, in case that the information processing device 12 and the image forming device 14 for output are capable of communicating with each other, that is, the print image data can be transmitted to the image forming device 14 for output, the print image data is transmitted from the information processing device 12 to the image forming device 14 for output.

On the other hand, in case that the information processing device 12 is unable to communicate with the image forming device 14 for output, that is, the print image data cannot be transmitted to the image forming device 14 for output, another image forming device is newly set as the image forming device 14 for output, instead of the image forming device 14 for output that is no available to be transmitted. For example, among the plurality of image forming devices 14, the image forming device having the largest number of transmissions of the print image data is set as the image forming device 14 for output, except for the image forming device 14 for output that cannot be transmitted.

When the print image data is transmitted from the information processing device 12 to the image forming device 14 for output, and the image forming device 14 for output receives the print image data, then the print image data is stored in the storage 56 in the image forming device 14 for output. Note that when the old data exists in the storage 56 in the image forming device 14 for output, the old data is overwritten with the newly received print image data (update data) (the old data is deleted from the storage 56).

Figure 4:
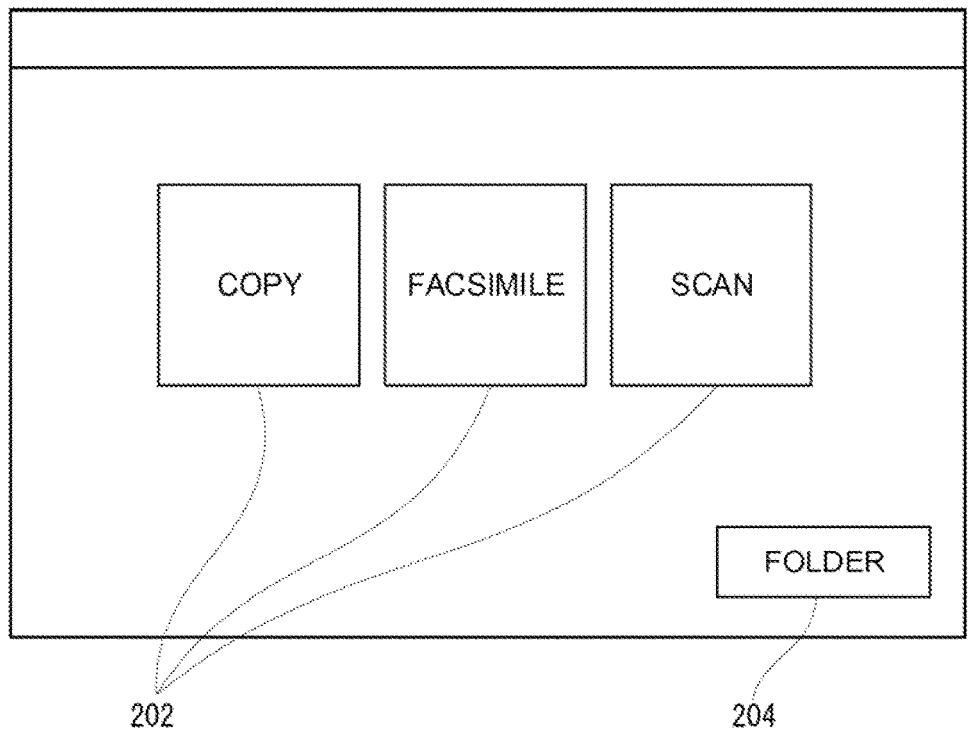
FIG. 4 is a diagram illustrating an example of a home screen displayed on a display of the image forming device.

Next, the operation of the image forming device 14 will be described. In the image forming device 14, when the power of the image forming device 14 is turned on and in a standby state in which each function is executable, a home screen 200 as illustrated in FIG. 4 is displayed on the display 62. The home screen 200 is an example of the home screen 200, which is a screen for selecting a desired function from various functions (or jobs) executable by the image forming device 14. The operation input on the home screen 200 is accepted when the user authentication is successful. In the image forming device 14, for example, an ID and a password are input by the IC card and short-range wireless communication by the communicator 72, and the user authentication is performed.

A plurality of function selection keys 202 and a folder key 204, which are a software key, are provided on the home screen 200.

The function selection keys 202 are provided to select any one of a copy function, a fax function, and a scan function. When one of the function selection keys 202 is operated, a screen for enabling the function assigned to the operated function selection key 202 is displayed on the display 62.

The folder key 204 is provided for displaying a list of print image data registered by a user who has succeeded in the user authentication (authenticated user). The print image data registered by the authenticated user is print image data which has been transmitted from the user terminal 16 to the information processing device 12, and has not been printed. Further, when the print image data having the same data name and the same data format are registered a plurality of times, only the print image data with the last update date and time is registered.

Figure 5:
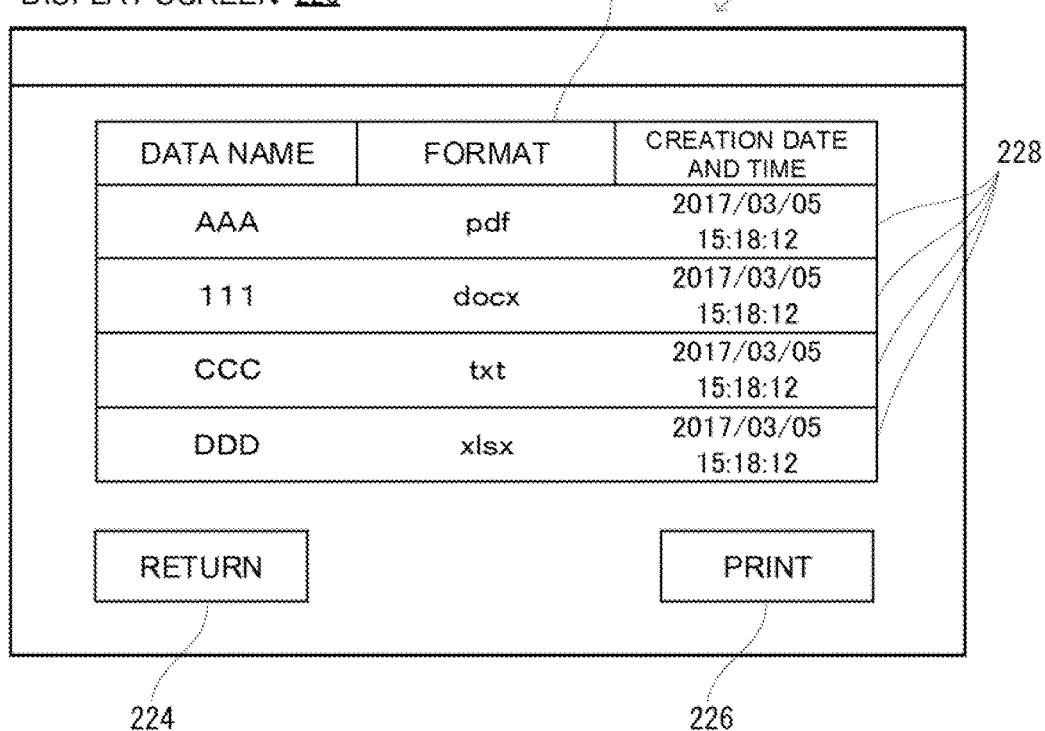
FIG. 5 is a diagram illustrating an example of a display screen displayed on the display of the image forming device.

When the folder key 204 is operated, the storage 36 in the information processing device 12 is referred to, and a display screen 220, which is a screen for displaying a list of print image data registered by the authenticated user, is displayed on the display 62 as illustrated in FIG. 5.

A display region 222, a return key 224, and a print key 226 are provided on the display screen 220. Further, a plurality of data selection keys 228 are provided in the display region 222.

The display region 222 is provided for displaying the data selection keys 228. The return key 224 is provided for displaying the front screen on the display 62. When the return key 224 is operated, the home screen 200 is displayed on the display 62.

The data selection key 228 is provided for selecting print image data related to the authenticated user. When the data selection key 228 is operated, the print image data (selection print image data) assigned to the operated data selection key 228 is selected. That is, when the data selection key 228 is operated, the selection print image data to be printed by the user is selected.

The print key 226 is provided for executing printing (enabling the print function). When the print key 226 is operated in a state where the selection print image data is selected, the print image is printed on the recording medium based on the selection print image data.

When the print image data corresponding to the selection print image data is stored in the storage 56 of the image forming device, the print image is printed based on the print image data stored in the storage 56.

On the other hand, when the print image data corresponding to the selection print image data is not stored in the storage 56 of the image forming device, an instruction (transmission command) is transmitted from the image forming device 14 being operated by the authenticated user to the information processing device 12 to transmit the designated print image data (the selection print image data is designated in the present embodiment) to the image forming device 14. When the information processing device 12 receives the transmission command, the information processing device 12 sets the image forming device 14 that is the source of the transmission (the image forming device 14 being operated by the authenticated user) as the image forming device 14 for output, and transmits the selection print image data to the image forming device 14 that is the transmission source of the transmission command. When the image forming device 14 that is the transmission source of the transmission command receives the selection print image data, a print image is printed based on the selection print image data.

When the image forming device 14 outputs the print image based on the selection print image data, the selection print image data is deleted from the storage 56.

Note that when the selection print image data is stored in the storage 56 of another image forming device 14, the communication speed between the image forming device 14 being operated by the authenticated user and the another image forming device 14 in which the selection print image data is stored, and the communication speed between the image forming device 14 being operated by the authenticated user and the information processing device 12 are measured or estimated. When the communication speed with each device is measured or estimated, the transmission command is transmitted to the device having the fastest communication speed. Since the measurement method and the estimation method of the communication speed are well-known techniques, the detailed description therefor will be omitted.

When the print function is enabled and the print image based on the selection print image data is output, an instruction (notification command) for notifying that the selection print image data has been printed is transmitted to the information processing device 12.

When the notification command is received by the information processing device 12 and the printed selection print image data is stored in the storage 36 of the information processing device 12, then the selection print image data is deleted. When the information processing device 12 receives the notification command, an instruction (deletion command) for deleting the selection print image data is transmitted to the image forming device 14 that stores the selection print image data. Therefore, in the image forming device 14 that has received the deletion command, the selection print image data is deleted. When there is no image forming device 14 that stores the selection print image data, the deletion command is not transmitted.

In the first embodiment, the transmission destination of the print image data (image forming device 14 for output) and the like is determined based on various tables.

In the information processing device 12, a table (identification table) 300 for identifying a user in advance is registered. Further, a table indicating a transmission history for each user is registered in the information processing device 12.

The table indicating the transmission history includes a table (old data table) 320 indicating the old data stored in each of the image forming devices 14, a transmission number table indicating the number of transmissions of print image data to each of the image forming devices 14, and a table (status table) 380 indicating the usage status of each of the image forming devices 14.

The transmission number table also includes a table (first transmission number table) 340 indicating the number of transmissions per data format for each of the image forming devices 14 and a table (second transmission number table) 360 indicating the number of transmissions per keyword for each of the image forming devices 14.

FIG. 6 is an example of the identification table 300. In the identification table 300 in FIG. 6, a login ID and a common ID are described in association with the user ID.

The user ID is identification information for identifying a user who has performed a registration operation of print image data. The user ID corresponds to the user identification data. Further, the login ID is identification information for identifying a user who has already been authenticated. Further, the common ID is identification information for identifying a user having the common user ID and login ID.

In the identification table 300, a character string corresponding to the user ID is described in the column of the user ID. This also applies to the column of the user ID in each of the old data table 320, the first transmission number table 340, the second transmission number table 360, and the status table 380, which will be described later.

Further, in the identification table 300, a character string corresponding to the login ID is described in the column of the login ID, and a character string corresponding to the common ID is described in the column of the common ID.

When the information processing device receives the print image data and the user identification data, the information processing device refers to the identification table 300, and identifies the user from the common ID corresponding to the user ID. Further, the image forming device 14 identifies the user from the common ID corresponding to the login ID input at the time of the user authentication.

FIG. 7 is an example of the old data table 320. The last update date and time, the data format, the keyword, and the device ID are described in association with the data name in the old data table 320 in FIG. 7. It should be noted that the device ID and the transmission date and time may be described in plural in association with a single data name.

The data format is, for example, a text format, a PDF format, an image format, or the like. Note that a character (alphabet) corresponding to each data format is described in FIG. 7.

The device ID is identification information for identifying the image forming device 14 to which the old data has been transmitted (the old data is stored). Further, the device ID corresponds to the device identification data. This applies to the other device ID (FIGS. 8, 9 and 10) as well.

The transmission date and time is a date and time when the old data corresponding to the data name, the data format, and the keyword is transmitted to the image forming device 14 corresponding to the device ID.

In each column of the old data table 320, a character, a character string or the like corresponding to the data name, the last update date and time, the data format, the keyword, the device ID, and the transmission date and time is described.

In the first embodiment, by referring to the old data table 320, it is determined which image forming device 14 stores the old data, and the data name, the last update date and time, the data format, the keyword, and the like of the old data.

Also, by referring to the old data table 320, the transmission destination of the update data is set, and it is determined whether the transmission destination of the deletion command exists.

In the first embodiment, when the print image data is transmitted to the image forming device 14 for output, the data name, the last update date and time, the data format, and the like of the print image data are newly described in the old data table 320.

When the update data is transmitted to the image forming device 14 for output, the last update date and time and the transmission date and time corresponding to the data name of the old data are rewritten (updated) to the last update time and the transmission date and time corresponding to the update data.

Further, when the notification command is transmitted to the information processing device 12, the data name, the data format, the last update date and time, and the like of the selection print image data are deleted from the old data table 320.

FIG. 8 is an example of the first transmission number table 340. In the first transmission number table 340 in FIG. 8, the total number of transmissions and the number of transmissions in each data format corresponding to the device ID are described.

The device ID in the first transmission number table 340 is identification information of the image forming device 14 to which the print image data has been transmitted. This applies to the device ID in the second transmission number table 360 as well.

The total number of transmissions is the number of times that the print image data is transmitted to the image forming device 14 corresponding to the device ID. This also applies to the total number of transmissions in the second transmission number table 360 (FIG. 9), which will be described later.

A number indicating each of the number of transmissions is described in each of the column of the total number of transmissions and the column of the number of transmissions in each data format.

In the first embodiment, when the first transmission number table 340 is referred to, the number of transmissions of the print image data to each of the image forming devices 14 is determined. This also applies to the case where the second transmission number table 360 (FIG. 9) is referred to.

Further, when the first transmission number table 340 is referred to, the number of transmissions of the print image data to each of the image forming devices 14 is determined for each data format.

Further, when the first transmission number table 340 is referred to, the number of transmissions of the print image data in each data format is determined for each of the image forming devices 14.

In the first embodiment, when the print image data is transmitted to the image forming device 14, the device ID corresponding to the image forming device 14, the number of transmissions corresponding to the data format of the print image data, and the total number of transmissions are added, and the added number of transmissions is newly described in the first transmission number table 340.

Further, when the device ID corresponding to the image forming device 14 is described, but the number of transmissions corresponding to the data format of the print image is not described, then the number of transmissions corresponding to the data format of the print image data is newly described in association with the device ID. Further, in this case, the total number of transmissions is rewritten.

Further, when the device ID corresponding to the image forming device 14 and the number of transmissions corresponding to the data format of the print image data are described, the number of transmissions and the total number of transmissions are rewritten.

FIG. 9 is an example of the second transmission number table 360. In the second transmission number table 360 in FIG. 9, the total number of transmissions and the number of transmissions of each keyword are described in association with the device ID.

A number indicating each number of transmissions is described in each of the columns of the number of transmissions of each keyword.

In the first embodiment, when the second transmission number table 360 is referred to, for example, the number of transmissions of the print image data to a predetermined image forming device 14 is determined for each keyword.

Further, when the second transmission number table 360 is referred to, the number of transmissions of the print image data in a predetermined keyword is determined for each of the image forming devices 14.

In the first embodiment, when the print image data is transmitted to the image forming device 14, similarly to the first transmission number table, the rewriting of the second transmission number table 360 and/or the addition to the second transmission number table 360 are performed as appropriate.

Note that, when a transmission command is transmitted, and print image data corresponding to the transmission command is transmitted between the image forming devices 14, then the old data table 320, the first transmission number table 340, and the second transmission number table 360 are not rewritten.

This also applies to a case where the transmission command is transmitted from the image forming device 14 to the information processing device 12, and the print image data is transmitted from the information processing device 12 to the image forming device 14 in accordance with the transmission command.

FIG. 10 is an example of the status table 380. In the status table 380 in FIG. 10, the number of uses and the date and time of use are described in correspondence with the device ID.

The number of uses is the number of times that the image forming device 14 corresponding to the device ID has been used. More specifically, the number of uses is the number of times that any one of the copy function, the printer function, the scanner function, and the facsimile function is enabled (the job has been executed).

The date and time of use is the date and time when the image forming device 14 corresponding to the device ID is used last time.

In the column of the number of uses, a number indicating the number of uses of the image forming device 14 corresponding to the device ID is described. In the column of the date and time of use, a character, a character string, and the like indicating the date and time of the use of the image forming device 14 corresponding to the device ID are described.

In the first embodiment, when the status table 380 is referred to, for example, the image forming device 14 most frequently used by the user is determined.

Further, when the status table 380 is referred to, the image forming device 14 used last by the user is determined.

In the first embodiment, when any of the copy function, the printer function, the scanner function, and the facsimile function is enabled, that is, when the image forming device 14 is used by an authenticated user, a signal (use signal) indicating that the image forming device 14 has been used is transmitted from the image forming device 14 to the information processing device 12.

In the information processing device 12, the status table 380 is updated in response to the reception of the use signal. More specifically, the device ID, the number of uses, and the date and time of use corresponding to the used image forming device 14 are newly described in the status table 380.

When the device ID and the like corresponding to the image forming device 14 are described, the number of uses and the date and time of use corresponding to the device ID are rewritten.

Note that although a character string, a number and the like are described in each column of each table described above, these contents are only created and used by the internal processing in the information processing device 12 or the image forming device 14. Therefore, the contents described in each column of the table may be described by a symbol or the like that cannot be decrypted by a person.

Figure 11:
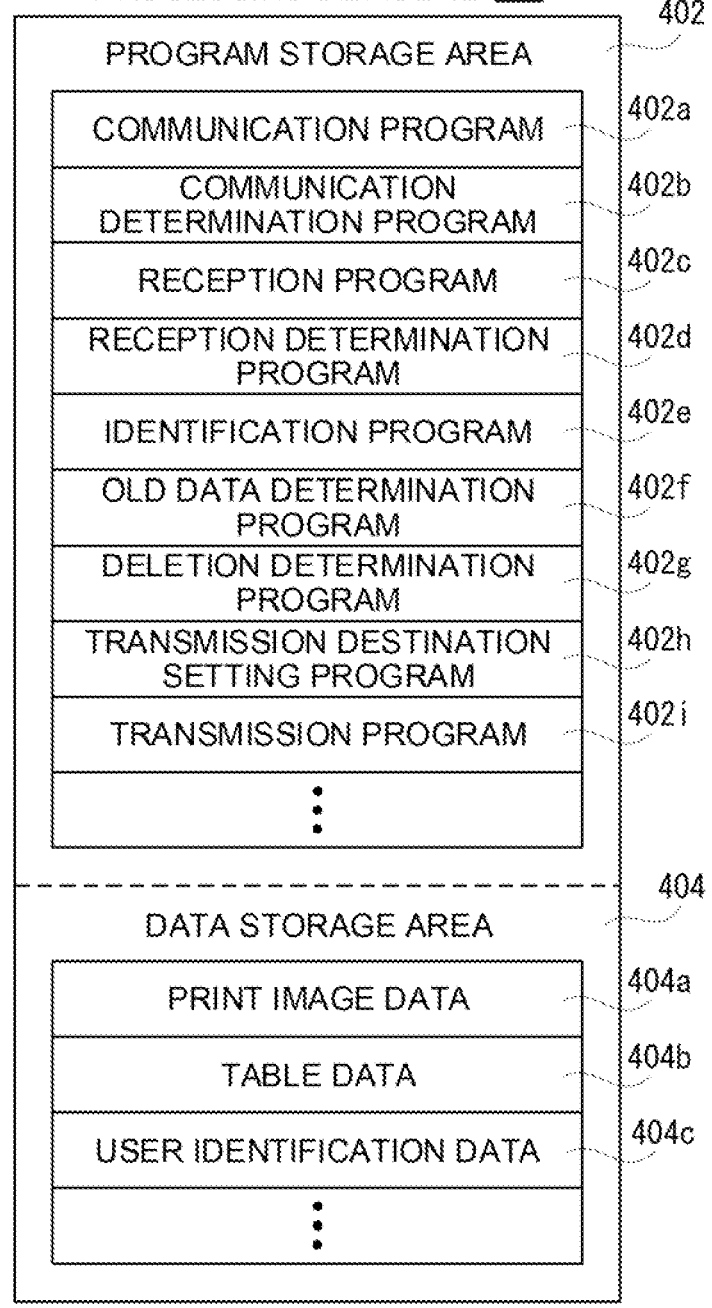
FIG. 11 is a diagram illustrating an example of a memory map of a random access memory (RAM) in the information processing device.

FIG. 11 is a diagram illustrating an example of a memory map 400 of the RAM 34 in the information processing device 12 in FIG. 1. As illustrated in FIG. 11, the RAM 34 includes a program storage area 402 and a data storage area 404. Further, the program storage area 402 in the RAM 34 stores a control program for the information processing device 12 as an example of the information processing program.

The control program for the information processing device 12 includes a communication program 402a, a communication determination program 402b, a reception program 402c, a reception determination program 402d, an identification program 402e, an old data determination program 402f, a deletion determination program 402g, a transmission destination setting program 402h, and a transmission program 402i.

The communication program 402a is a program for controlling the communicator 38 and communicating with another device via the network 18.

The communication determination program 402b is a program for determining whether it is possible to communicate with another device.

The reception program 402c includes a data reception program, a command reception program, and a signal reception program.

The data reception program is a program for receiving print image data. The command reception program is a program for receiving each command such as the transmission command, the notification command, and the deletion command. The signal reception program is a program for receiving the use signal. When the print image data, the command, and the use signal are received, the communication program 402a is executed.

The reception determination program 402d includes a data reception determination program, a command reception determination program, and a signal reception determination program.

The data reception determination program is a program for determining whether print image data is received. The command reception program is a program for determining whether each command has been received. The signal reception determination program is a program for determining whether a use signal is received.

The identification program 402e is a program for, when print image data is received, identifying a user based on the user identification data associated with the print image data and the identification table 300.

The old data determination program 402f is a program for determining, after a user is identified, whether the old data corresponding to print image data exists based on the print image data and the old data table 320 of the user.

The deletion determination program 402g is a program for determining whether a transmission destination of the deletion command exists based on the old data table 320 when a notification command is received.

The transmission destination setting program 402h is a program for selecting (setting) the image forming device 14 for output, based on the transmission history and the like of a user who has transmitted print image data.

Further, the transmission destination setting program 402h is a program for setting the image forming device 14 for storing old data in the image forming device 14 for output based on the old data table 320 when there is the old data corresponding to the received print image data.

Further, the transmission destination setting program 402h is also a program for setting the image forming device 14 for output based on at least one of the first transmission number table 340 and the second transmission number table 360 when there is no old data.

Furthermore, the transmission destination setting program 402h is a program for newly setting an alternative image forming device 14 for output, based on the transmission history of the print image data of a user, in a case where the communication with the image forming device 14 for output is incapable.

The transmission program 402i includes a data transmission program and a command transmission program.

The data transmission program is a program for transmitting print image data. More specifically, the data transmission program is a program for transmitting print image data to the image forming device 14 for output which can be communicated.

Further, the data transmission program is also a program for transmitting the designated print image data to the image forming device 14 that is the transmission source of a transmission command when the transmission command is received.

The command transmission program is a program for transmitting each command to the image forming device 14. More specifically, the command transmission program is a program for receiving a notification command and transmitting a deletion command to the image forming device 14 that is the transmission destination when the transmission destination of the deletion command exists. Note that, when transmitting the print image data and the command, the communication program 402a is executed.

Although not illustrated, the program storage area 402 also stores another program and the like necessary for controlling the image forming device 14. For example, after the user is identified, stored are a program for storing the print image data received by the information processing device 12, a program for adding and rewriting to various tables when sending print image data and sending and receiving various commands, and the like.

Print image data 404a, table data 404b, and user identification data 404c are stored in the data storage area 404. Note that the description for the print image data 404a and the user identification data 404c will be omitted.

The table data 404b includes data corresponding to the identification table 300, data corresponding to the old data table 320, data corresponding to the first transmission number table 340, data corresponding to the second transmission number table 360, and data corresponding to the status table 380 and the like.

Although not illustrated, the data storage area 404 stores other data necessary for executing the information processing program, and a flag and a counter (timer) necessary for executing the information processing program are also provided.

Figure 12:
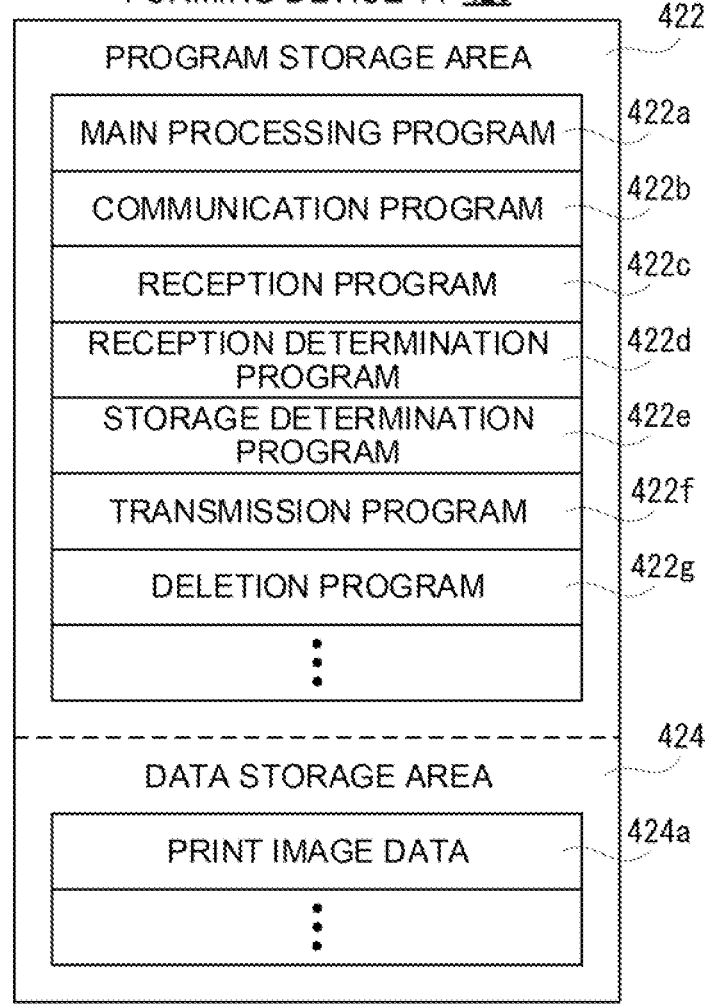
FIG. 12 is a diagram illustrating an example of a memory map of the RAM in the image forming device.

FIG. 12 is a diagram illustrating an example of a memory map 420 of the RAM 54 in the image forming device 14 in FIG. 1. As illustrated in FIG. 12, the RAM 54 includes a program storage area 422 and a data storage area 424. Further, a control program for the image forming device 14 is stored in the program storage area 422 of the RAM 54 as an example of the information processing program.

The control program of the image forming device 14 includes a main processing program 422a, a communication program 422b, a reception program 422c, a reception determination program 422d, a storage determination program 422e, a transmission program 422f, and a deletion program 422g.

The main processing program 422a is a program for executing the overall processing of the image forming device 14. For example, the main processing program 422a includes a program for detecting operation detection data corresponding to an operation on each operator of the image forming device, a program for generating display images for displaying various screens, a program for controlling the image reader 68 to read a document placed on a mounting table and generate a read image, a program for controlling the image generator 70 to print an output image, a print image, or the like on a recording medium, and so on.

The communication program 422b is a program for controlling the communicator 72 and communicating with another device via the network 18.

The reception program 422c includes a data reception program and a command reception program. The data reception program is a program for receiving print image data. The command reception program is a program for receiving each command. Note that, when the print image data and the command are received, the communication program 422b is executed.

The reception determination program 402d includes a data reception determination program and a command reception determination program. The data reception determination program is a program for determining whether to receive print image data. The command reception program is a program for determining whether to receive each command.

The storage determination program 422e is a program for determining whether selection print image data is stored in the storage 56.

The transmission program 422f includes a command transmission program and a signal transmission program.

The command transmission program is a program for transmitting each command. More specifically, the command transmission program is a program for transmitting a transmission command to the information processing device 12 when no selection print image data is stored in the storage 56.

Further, the command transmission program is also a program for transmitting a notification command to the information processing device 12 when a printed image is printed on a paper sheet.

The signal transmission program is a program for transmitting a use signal to the information processing device 12 when the copy function or the like of the image forming device 14 is enabled. Note that, when a command and a use signal are transmitted, the communication program 422b is executed.

The deletion program 422g is a program for deleting print image data. More specifically, the deletion program 422g is a program for deleting print image data corresponding to a print image after the print image is printed on a paper sheet.

Further, the deletion program 422g is also a program for deleting selection print image data when a deletion command is received.

Although not illustrated, the program storage area 422 also stores another program necessary for the controlling the image forming device 14. For example, a program for performing user authentication, a program for storing received print image data in the storage 56, and the like are stored.

Print image data 424a is stored in the data storage area 424. Note that the print image data 424a is print image data transmitted from the information processing device 12. Therefore, the print image data 424a corresponds to the print image data 404a.

Figure 13:
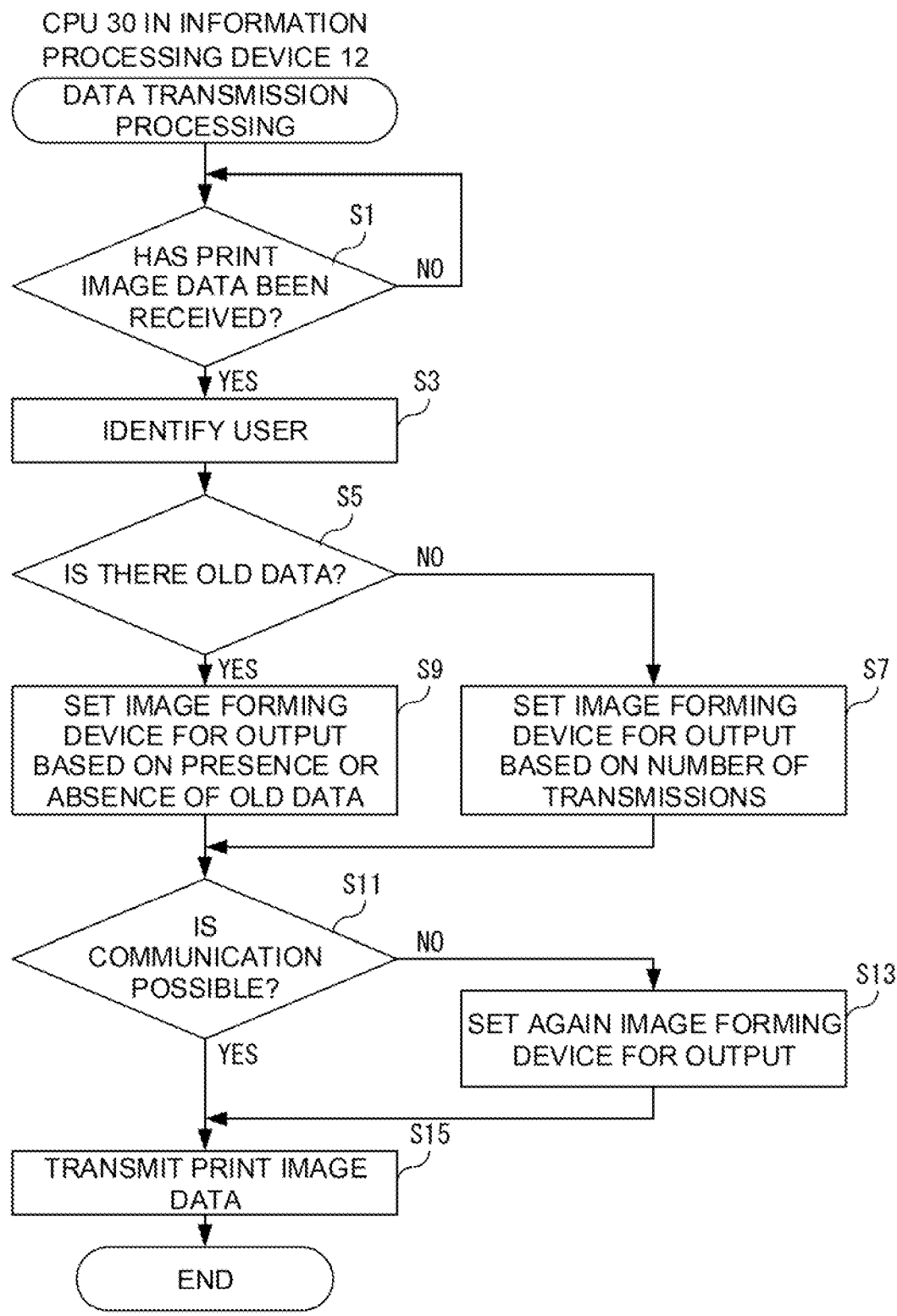
FIG. 13 is a flow chart illustrating an example of data transmission processing of a central processing unit (CPU) in the information processing device.

FIG. 13 is a flow chart illustrating an example of data transmission processing of the CPU 30 in the information processing device 12 in FIG. 1. The data transmission processing is initiated, for example, when the main power of the information processing device 12 is turned on.

As illustrated in FIG. 13, the CPU 30 determines whether print image data has been received in step S1. In case of "NO" in the step S1, that is, when no print image data has received, the process returns to the step S1. On the other hand, in case of "YES" in the step S1, that is, when print image data is received, the process proceeds to step S3.

In the step S3, the CPU 30 identifies the user who has registered the print image, and determines in step S5 whether there is old data. In case of "NO" in the step S5, that is, when there is no old data, in step S7, the CPU 30 set the image forming device 14 for output based on the number of transmissions of the print image data corresponding to the identified user, and the process proceeds to step S11.

On the other hand, in case of "YES" in the step S5, that is, when there is old data, in step S9, the CPU 30 set the image forming device 14 that stores the old data as the image forming device 14 for output, and the process proceeds to the step S11.

In the step S11, the CPU 30 determines whether the communication with the image forming device 14 for output is possible. In case of "NO" in the step S11, that is, when the communication with the image forming device 14 for output is impossible, in step S13, the CPU 30 newly sets an alternative image forming device 14 for output, and the process proceeds to step S15. On the other hand, in case of "YES" in the step S11, that is, when the communication with the image forming device 14 as the transmission destination is possible, in the step S15, the CPU 30 transmits the print image data to the image forming device 14 for output, and ends the data transmission processing.

Figure 14:
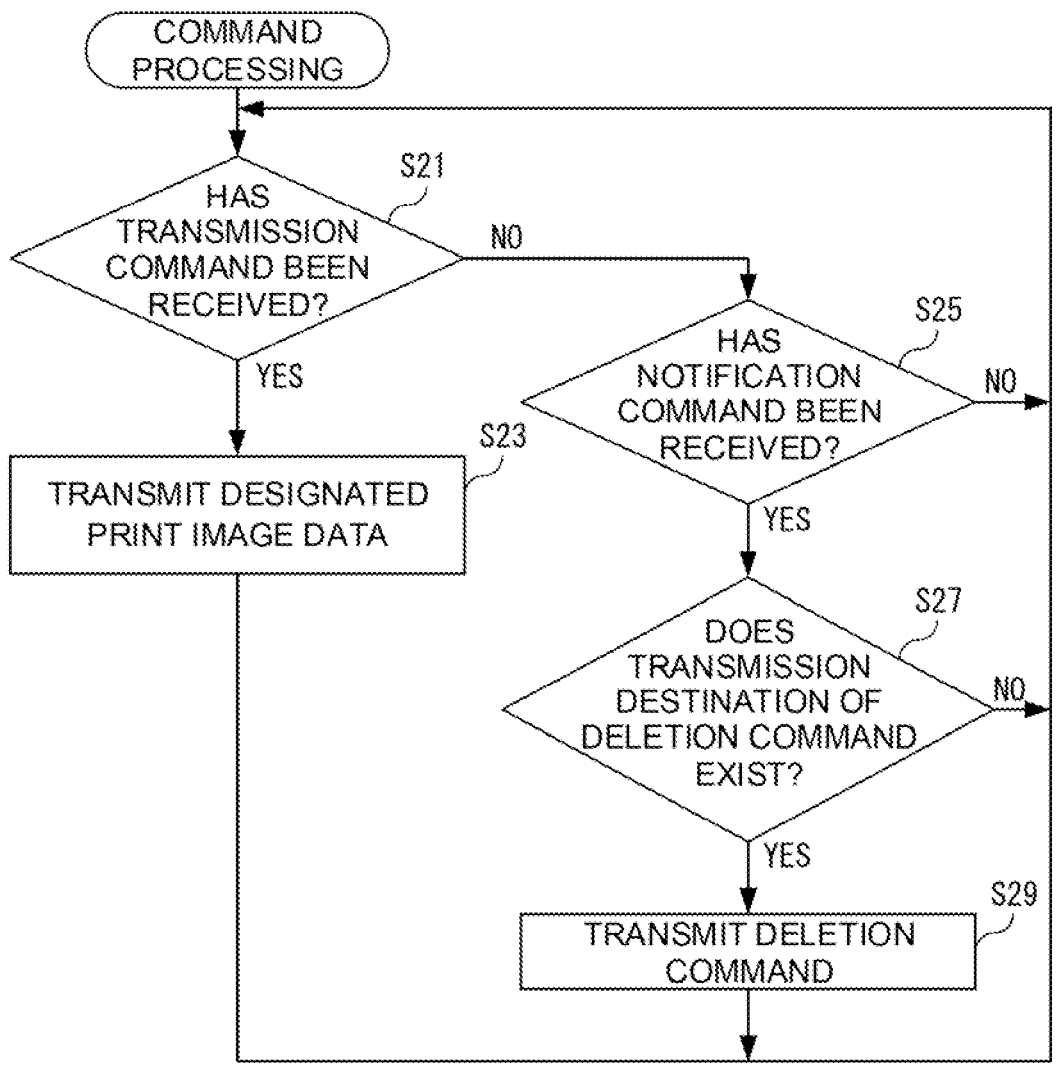
FIG. 14 is a flow chart illustrating an example of command processing of the CPU in the information processing device.

FIG. 14 is a flow chart illustrating an example of command processing of the CPU 30 in the information processing device 12 in FIG. 1. The command processing is initiated when the main power of the information processing device 12 is turned on.

As illustrated in FIG. 14, in step S21, the CPU 30 determines whether a transmission command has been received. In case of "YES" in the step S21, that is, when a transmission command is received, in step S23, the CPU 30 transmits the designated print image data to the image forming device 14 that is the transmission source of the transmission command, and the process returns to the step S21.

On the other hand, in case of "NO" in the step S21, that is, when no transmission command is received, the CPU 30 determines whether a notification command is received in step S25. In case of "NO" in the step S25, that is, when no notification command is received, the process returns to the step S21. On the other hand, in case of "YES" in the step S25, that is, when a notification command is received, the CPU 30 determines in step S27 whether the transmission destination of a deletion command exists. Here, the CPU 30 determines whether there is the image forming device 14 that stores the selection print image data.

In case of "NO" in the step S27, that is, when the transmission destination of a deletion command does not exist, the process returns to the step S21. On the other hand, in case of "YES" in the step S27, that is, when the transmission destination of the deletion command exists, the CPU 30 transmits the deletion command to the transmission destination of the deletion command in step S29, and the process returns to the step S21.

Figure 15:
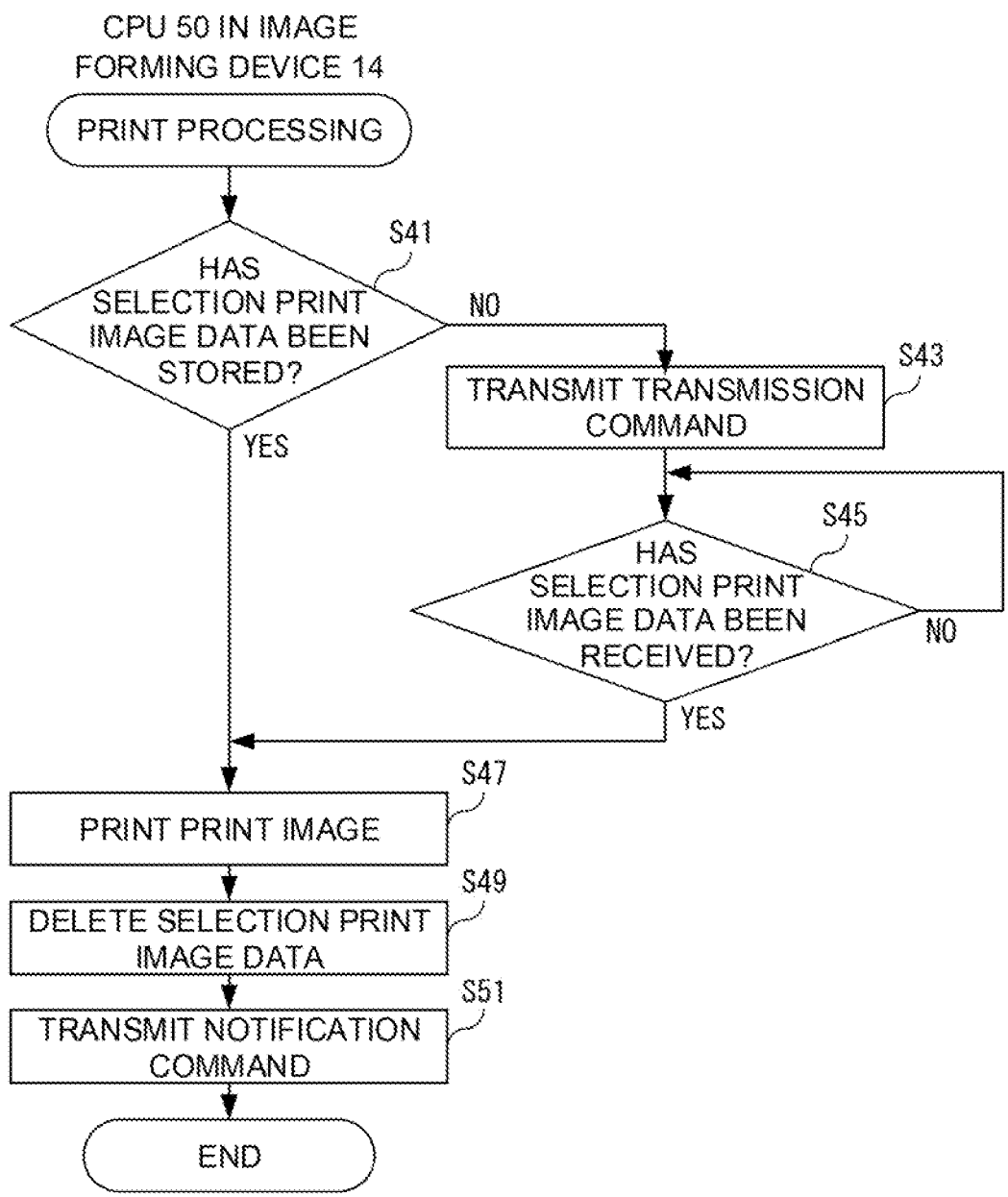
FIG. 15 is a flow chart illustrating an example of print processing of the CPU in the image forming device.

FIG. 15 is a flow chart illustrating an example of print processing of the CPU 50 in the image forming device 14 in FIG. 1. The print processing is initiated when the print function is enabled in a state where the print image data is selected after the user authentication is performed.

As illustrated in FIG. 15, in step S41, the CPU 50 determines whether the selection print image data is stored in the storage 56. In case of "NO" in the step S41, that is, when the selection print image data is not stored in the storage 56, in step S43, the CPU 50 transmits the transmission command to the information processing device 12, and determines in step S45 whether the selection print image data is received. In case of "NO" in the step S45, that is, when the selection print image data is not received, the process returns to the step S45. On the other hand, in case of "YES" in the step S45, that is, when the selection print image data is received, the process proceeds to step S47.

On the other hand, in case of "YES" in the step S41, that is, when the selection print image data is stored in the storage 56, the CPU 50 prints the print image based on the selection print image data in the step S47, and deletes the selection print image data from the storage 56 in step S49.

Subsequently, in step S51, the CPU 50 transmits a notification command to the information processing device 12, and ends the print processing.

Figure 16:
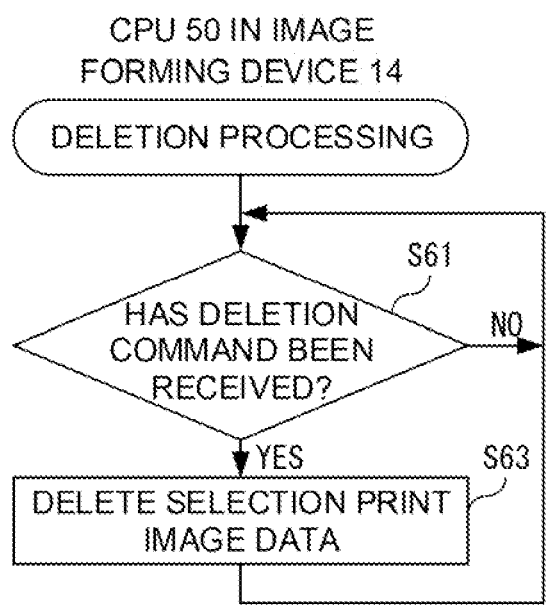
FIG. 16 is a flow chart illustrating an example of deletion processing of the CPU in the image forming device.

FIG. 16 is a flow chart illustrating an example of deletion processing of the CPU 50 in the image forming device 14 in FIG. 1. The deletion processing is initiated when the main power of the image forming device 14 is turned on.

As illustrated in FIG. 16, the CPU 50 determines in step S61 whether a deletion command has been received. In case of "NO" in the step S61, that is, when a deletion command is not received, the process returns to the step S61. On the other hand, in case of "YES" in the step S61, that is, when a deletion command is received, the CPU 50 deletes the selection print image data from the storage 56 in step S63, and the process returns to the step S61.

According to the first embodiment, it is possible to save the time and effort for selecting the transmission destination of the print image data.

Second Embodiment

A second embodiment is the same as the first embodiment except that the setting of the transmission destination of print image data is changed to be performed by the image forming device 14. Hereinafter, although the second embodiment will be described in detail, the description overlapping with the first embodiment will be omitted.

In the second embodiment, each of the image forming devices 14 accesses the storage 36 in the information processing device 12 at a predetermined cycle (for example, once every five minutes).

In the second embodiment, each of the image forming devices 14 can set the image forming device 14 for output. Therefore, in case that the image forming device 14 accesses the storage 36, when there is new print image data in which the image forming device 14 is set as the image forming device 14 for output, a transmission command for designating the new print image data is transmitted from the image forming device 14 to the information processing device 12.

Here, the new print image data is print image data that is not stored in the storage 36 when the storage 36 is accessed last time, and is stored in the storage 36 when the storage 36 is accessed. Note that, when the storage 36 is accessed for the first time, all the print image data stored in the storage 36 corresponds to the new print image data.

Further, when there is a plurality of new print image data, the above-described processing is performed for each new print image data.

The memory map 400 according to the second embodiment is a memory map similar to the memory map 400 in FIG. 11.

Note that a control program of the information processing device 12 according to the second embodiment does not necessarily include the communication determination program 402b, the identification program 402e, the old data determination program 402f, and the transmission destination setting program 402h.

A data transmission program included in the transmission program 402i according to the second embodiment is also a program for transmitting new print image data to the image forming device 14 that is the transmission source of a transmission command when the transmission command for designating the new print image data is received.

Further, in the second embodiment, in order to realize the operation described above, a control program of the image forming device 14 according to the second embodiment includes a new data determination program, an identification program, an old data determination program, a transmission destination setting program, and a matching determination program.

Note that the identification program is the same program as the identification program 402e except that the target is changed from the print image data to the new print image data, so that the duplicate description therefor will be omitted. This applies to the old data determination program and the transmission destination setting program as well.

The new data determination program is a program for determining whether there is new print image data by referring to the storage 36 in the information processing device 12 at a predetermined cycle.

The matching determination program is a program for determining whether the image forming device 14, which is the set output destination, matches the own device.

Further, a command transmission program included in the transmission program 422f according to the second embodiment is a program for transmitting a new transmission command to the information processing device 12 when the image forming device 14 which is the output destination of a new signal print image is set and the image forming device 14 matches the own device.

Further, the data storage area 424 according to the second embodiment stores data indicating details of the print image data when referring to the storage 36.

Figure 17:
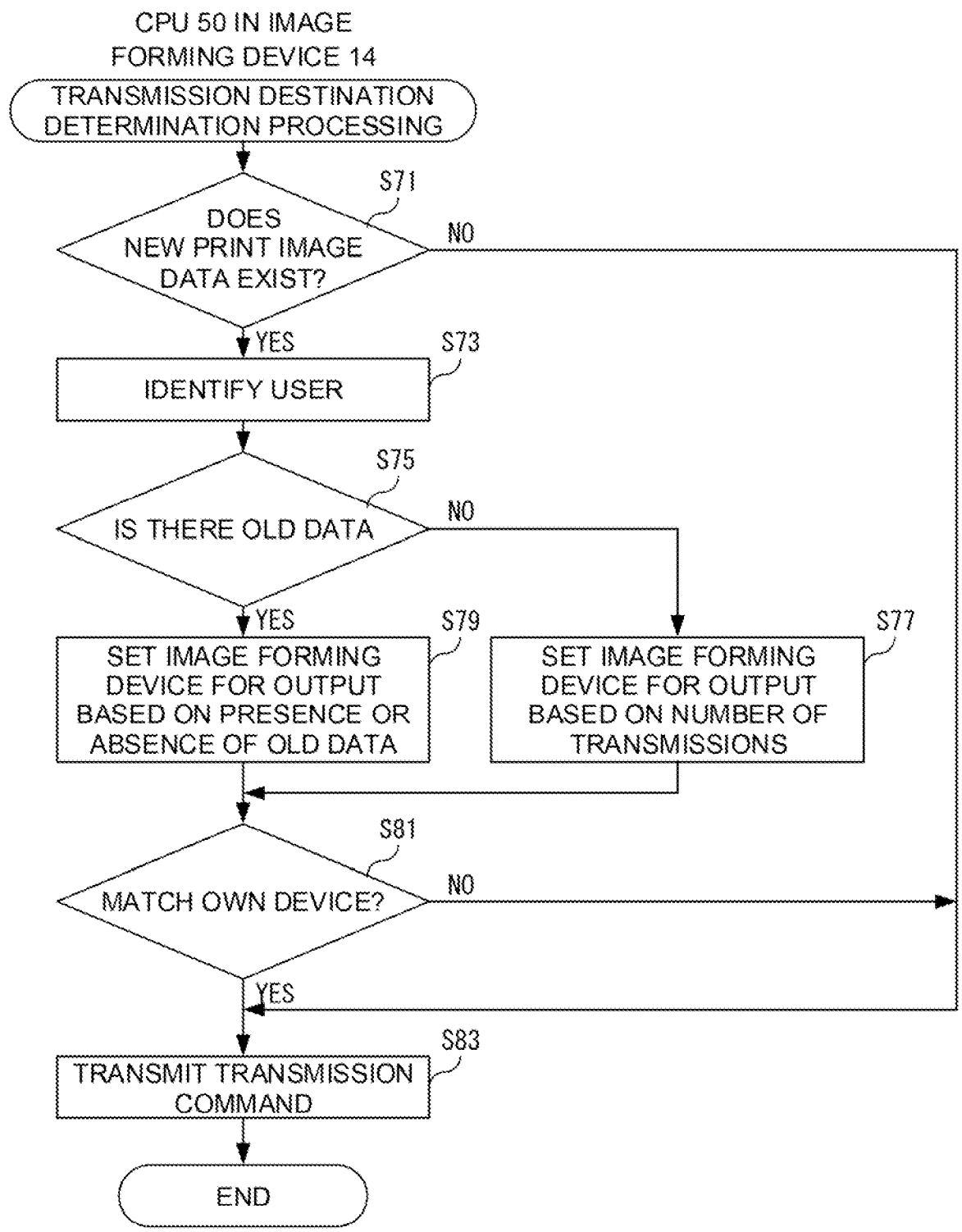
FIG. 17 is a flow chart illustrating an example of transmission destination determination processing of a CPU in an image forming device according to a second embodiment.

FIG. 17 is a flow chart illustrating an example of transmission destination determination processing of the CPU 50 in the image forming device 14 of the second embodiment. The transmission destination determination processing is initiated when the main power is turned on. Further, after the main power is turned on, the transmission destination determination processing is initiated at a predetermined cycle.

As illustrated in FIG. 17, the CPU 50 determines in step S71 whether there is new print image data. In case of "NO" in the step S71, that is, when there is no new print image data, the CPU 50 ends the transmission destination determination processing. On the other hand, in case of "YES" in the step S71, the process proceeds to step S73.

Note that steps S73 to S79 correspond to the steps S3 to S9, and therefore the duplicate description therefor will be omitted.

In step S81, the CPU 50 determines whether the image forming device 14 that is the output destination matches the own device. In case of "NO" in the step S81, that is, when the image forming device 14 that is the output destination does not match the own device, the CPU 50 ends the transmission destination determination processing. On the other hand, in case of "YES" in the step S81, that is, when the image forming device 14 that is the output destination matches the own device, the process proceeds to step S93.

In step S83, the CPU 50 transmits a transmission command specifying the new print image data to the information processing device 12, and ends the transmission destination determination processing.

According to the second embodiment, it is possible to save the time and effort for selecting the transmission destination of the print image data as in the first embodiment.

Note that the print image data or the like may be transmitted to a device other than the image forming device 14 connected to the network 18, for example, a local server or the like.

When a user terminal having a function of authenticating a user is used as the user terminal 16, the user identification data indicating the authenticated user may be transmitted to the information processing device 12 together with the print image data.

Further, the user authentication of the user terminal 16 and the image forming device 14 may be externally performed. In this case, the print image data and the user identification data indicating the authenticated user are transmitted to the information processing device 12. Further, in this case, the identification information for identifying the user indicated by the user identification data coincides with the identification information for identifying the user input to the image forming device 14, and therefore the user is identified by the identification information.

Further, the above-described embodiments are examples, and may be changed as appropriate in an actual product. Furthermore, the flow diagram illustrated in each of the above-described embodiments is merely an example, and the order of the steps can be arbitrarily changed as long as the same effect is obtained.

What is claimed is:

1. An information processing device comprising:
   a communicator that communicates with a plurality of devices;
   a memory that stores instructions and a number of transmissions of print image data for each user; and
   a processor that executes the instructions stored in the memory to:
   receive print image data through the communicator;
   set an image forming device for output that is highly likely to be used by a user from a plurality of image forming devices based on the number of transmissions when the print image data is received;
   determine whether to be capable of communicating with the image forming device for output before transmitting the print image data when the image forming device for output is set; and
   transmit the print image data to the image forming device for output through the communicator when the image forming device for output is set,
   wherein another image forming device is set as the image forming device for output based on the number of transmissions before transmitting the print image data when the image forming device for output is unable to communicate.

2. The information processing device according to claim 1,
   wherein the image forming device for output is set in accordance with a number of transmissions of print image data having a characteristic that is common to or related to the print image data.

3. The information processing device according to claim 2,
   wherein the image forming device for output is set based on a number of transmissions of a keyword or a data format that is the characteristic of the print image data.

4. A non-transitory computer-readable recording medium that stores a control program executed by an information processing device comprising a communicator that communicates with a plurality of devices, and a storage that stores a number of transmissions of print image data for each user, the control program for causing the information processing device to:
   receive print image data through the communicator;
   set for a transmission destination an image forming device for output that is highly likely to be used by a user from a plurality of image forming devices based on the number of transmissions when receiving the print image data;
   determine whether to be capable of communicating with the image forming device for output before transmitting the print image data when the image forming device for output is set, and
   transmit the print image data to the image forming device for output through the communicator when the image forming device for output is set, in the set for the transmission destination,
   wherein another image forming device is set as the image forming device for output based on the number of transmissions before transmitting the print image data when the image forming device for output is unable to communicate.

5. A method of controlling an information processing device comprising a communicator that communicates with a plurality of devices, and a storage that stores a number of transmissions of print image data for each user, the method comprising:
   (a) receiving print image data through the communicator;
   (b) setting for a transmission destination an image forming device for output that is highly likely to be used by a user from a plurality of image forming devices based on the number of transmissions when receiving the print image data in the (a);
   (c) determining whether to be capable of communicating with the image forming device for output before transmitting the print image data when the image forming device for output is set in the (b), and
   (d) transmitting the print image data to the image forming device for output through the communicator when the image forming device for output is set in the (b),
   wherein another image forming device is set as the image forming device for output based on the number of transmissions before transmitting the print image data when the image forming device for output is unable to communicate in the (c).

* * * * *